US008269986B2

(12) United States Patent
Jeong

(10) Patent No.: US 8,269,986 B2
(45) Date of Patent: Sep. 18, 2012

(54) IMAGE PROCESSING APPARATUS AND IMAGE PROCESSING METHOD

(75) Inventor: Sa-bong Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1360 days.

(21) Appl. No.: 11/865,781

(22) Filed: Oct. 2, 2007

(65) Prior Publication Data

US 2008/0094649 A1    Apr. 24, 2008

(30) Foreign Application Priority Data

Oct. 24, 2006    (KR) ........................ 10-2006-0103517

(51) Int. Cl.
*G06K 15/02*    (2006.01)
(52) U.S. Cl. ...... 358/1.11; 358/1.2; 358/1.15; 358/1.13; 707/805; 715/205; 715/261; 382/167; 382/199
(58) Field of Classification Search ................. 715/205, 715/261; 382/167, 199; 358/1.2, 1.1, 1.11, 358/1.15, 1.13, 518; 704/1; 709/206; 348/467; 707/805; 347/41
See application file for complete search history.

(56) References Cited

U.S. PATENT DOCUMENTS

| | | | | |
|---|---|---|---|---|
| 5,483,622 A * | 1/1996 | Zimmerman et al. | ....... | 358/1.15 |
| 5,666,543 A * | 9/1997 | Gartland | ........................ | 715/205 |
| 5,764,813 A * | 6/1998 | Murayama et al. | ........... | 382/271 |
| 5,862,257 A * | 1/1999 | Sekine et al. | .................. | 382/199 |
| 6,081,831 A * | 6/2000 | Miura | ............................. | 709/206 |
| 6,183,062 B1 * | 2/2001 | Curtis et al. | ..................... | 347/41 |
| 6,270,186 B1 * | 8/2001 | Smith et al. | ...................... | 347/41 |
| 6,288,725 B1 * | 9/2001 | Fu | .................................. | 345/467 |
| 6,947,158 B1 * | 9/2005 | Kitamura et al. | ............. | 358/1.15 |
| 7,133,143 B2 * | 11/2006 | Coleman | ........................ | 358/1.13 |
| 7,146,043 B2 * | 12/2006 | McElvain | ...................... | 382/167 |
| 7,248,386 B2 * | 7/2007 | Nishi | .............................. | 358/1.2 |
| 7,503,001 B1 * | 3/2009 | Lekutai | .......................... | 715/261 |
| 7,613,600 B2 * | 11/2009 | Krane | ............................... | 704/1 |
| 7,783,678 B2 * | 8/2010 | Kim | ................................. | 707/805 |
| 7,944,581 B2 * | 5/2011 | Shepherd et al. | .............. | 358/1.2 |
| 2004/0146199 A1 * | 7/2004 | Berkner et al. | ................ | 382/176 |
| 2006/0028701 A1 * | 2/2006 | Suzuki | ........................... | 358/518 |

FOREIGN PATENT DOCUMENTS

| | | |
|---|---|---|
| JP | 10-11044 | 1/1998 |
| KR | 2001-0111434 | 12/2001 |
| KR | 2005-7158 | 1/2005 |
| KR | 2005-19661 | 3/2005 |

OTHER PUBLICATIONS

Korean Office Action for corresponding Korean Patent Application No. 10-2006-0103517 dated May 18, 2011.

* cited by examiner

*Primary Examiner* — Benny Q Tieu
*Assistant Examiner* — Ashish K Thomas
(74) *Attorney, Agent, or Firm* — Staas & Halsey LLP

(57) ABSTRACT

An image processing apparatus. The apparatus includes an image processing unit to process printing data into image data capable of being outputted; and a controller to control the image processing unit to perform an edge emphasis processing of the font if a size of the font included in the printing data is greater than a predetermined minimum font size.

14 Claims, 11 Drawing Sheets

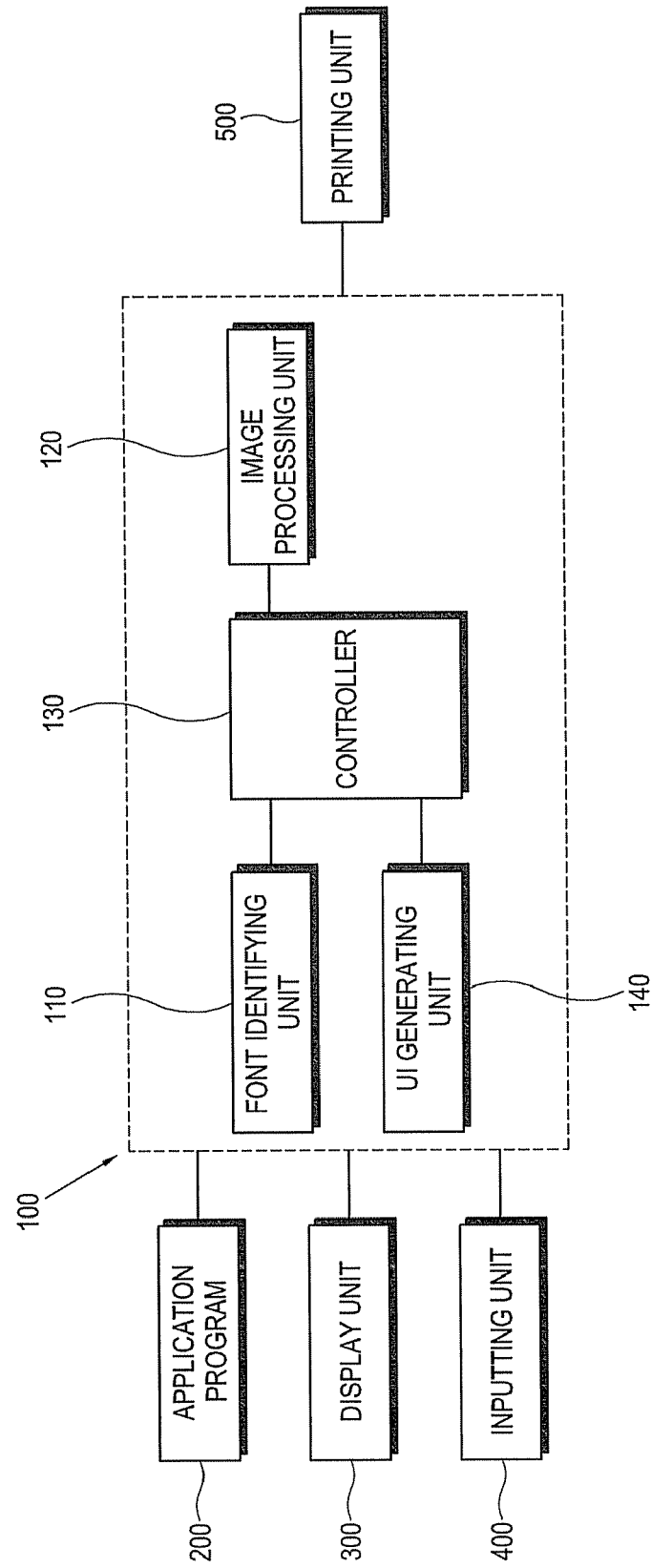

| FONT(F): | SIZE(S): |
|---|---|
| AngsanaUPC ▼ | 12 ▼ |

EFFECT(E)
- ☐ THICKLY         ☐ UNDERLINE
- ☐ TILTING TYPE    ☐ CANCELING LINE

EXAMPLE TEXT:

AngsanaUPC

| FONT(F): | SIZE(S): |
|---|---|
| Arial ▼ | 12 ▼ |

┌─ EFFECT(E) ─────────────────┐
│  ☐        ☐                 │
│  ☐        ☐                 │
└─────────────────────────────┘

EXAMPLE TEXT:

Arial

FIG. 5C

| Agency FB | 12 |
| Aharoni | 12 |
| Algerian | 12 |
| Andalus | 14 |
| Angsana New | 16 |
| AngsanaUPC | 14 |
| Arabic Transparent | 12 |
| Arial | 12 |
| Arial Baltic | 12 |

IMAGE PROCESSING APPARATUS AND IMAGE PROCESSING METHOD

CROSS-REFERENCE TO RELATED APPLICATION

This application claims the benefit of Korean Application No. 2006-103517, filed in the Korean Intellectual Property Office on Oct. 24, 2006, the disclosure of which is incorporated herein by reference.

BACKGROUND OF THE INVENTION

1. Field of the Invention

Aspects of the present invention relate to an image processing apparatus and an image processing method and, more particularly, to an image processing apparatus and an image processing method capable of improving discrimination of font image.

2. Description of the Related Art

Generally, an image processing apparatus, such as a laser printer or a host computer assembled with the laser printer, performs a halftoning image processing so as to print a scanned image or a displayed image in a display unit most similar to the original document. After the halftoning image processing, the image processing apparatus performs a trapping image processing that slightly overlaps an edge of an adjacent object so as to solve a color non-alignment caused by a misalignment of a developing device of colors CYMK (cyan, yellow, magenta, black) accommodated inside the laser printer, emphasizing an edge of the object.

FIGS. 1A and 1B denote a state before and a result after the trapping processing on font images having the same size, respectively. If the size of font is relatively large, the trapping image processing does not affect the discrimination capability of the font, i.e., the readability of the font.

FIGS. 2A and 2B denote a state before and a result after the trapping processing on font image having a smaller size than the font shown in FIGS. 1A and 1B. As shown in FIG. 2B, if the size of font is small, the trapping processing may depreciate the discrimination capability of font than before being trapping processed, resulting in an undiscriminating (unreadable) font.

SUMMARY OF THE INVENTION

Aspects of the present invention provide an image processing apparatus and an image processing method in which a user can discriminate font with naked eyes by improving an image quality of font.

According to an aspect of the present invention, an image processing apparatus is provided. The image processing apparatus comprises an image processing unit to process printing data into image data capable of being outputted; and a controller to control the image processing unit to perform an edge emphasis processing of a font if a size of the font included in the printing data is greater than a predetermined minimum font size corresponding to the font.

According to another aspect of the invention, the image processing apparatus further comprises a font identifying unit to identify a kind of the font and the size of font included in the printing data; wherein the controller controls the image processing unit to process the edge emphasis of the identified font if the size of the identified font is greater than the predetermined minimum font size corresponding to identified font.

According to another aspect of the invention, the image processing apparatus further comprises a display unit and a user interface (UI) generating unit to generate a UI to be displayed on the display unit for a user to input the predetermined minimum font size.

According to another aspect of the invention, the UI generating unit generates the UI to set the minimum font size according to the kind of font.

According to another aspect of the present invention, an image processing method is provided. The method comprises identifying a size of a font included in printing data; and processing an edge emphasis of the font if a size of the font is greater than a predetermined minimum font size corresponding to the font.

According to another aspect of the invention, the image processing method further comprises discriminating a kind of font before the processing of the edge emphasis of the font.

According to another aspect of the invention, the minimum size of font is set according to the kind of font when processing the edge emphasis of the font.

According to another aspect of the invention, the image processing method further comprises generating a user interface (UI) for a user to input the predetermined minimum font size; and displaying the UI to the user.

According to another aspect of the invention, the UI is provided to set the predetermined minimum font size according to the kind of font.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 is a block diagram of an image processing apparatus according to an example embodiment of the present invention;

FIGS. 4A and 4B are exemplary views illustrating that the real printed size of font is different according to the kind of font although the same size of font is set in an application program;

FIGS. 5A to 5C are exemplary views displayed by the image processing apparatus shown in FIG. 3.

DETAILED DESCRIPTION OF THE EMBODIMENTS

Figure 1A:
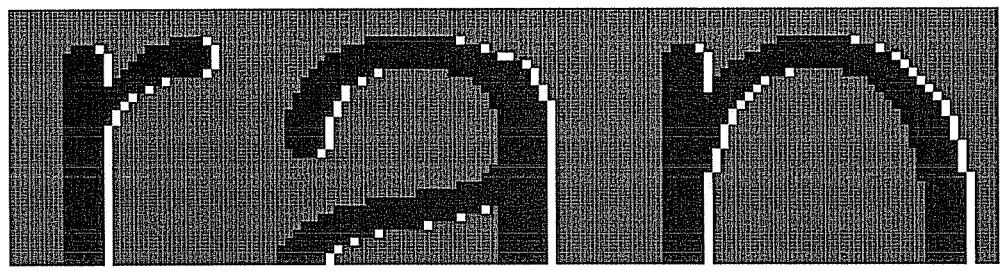
FIGS. 1A and 1B are exemplary views illustrating outputted results of font image before and after an edge emphasis processing of font in a conventional image processing apparatus.
Figure 1B:
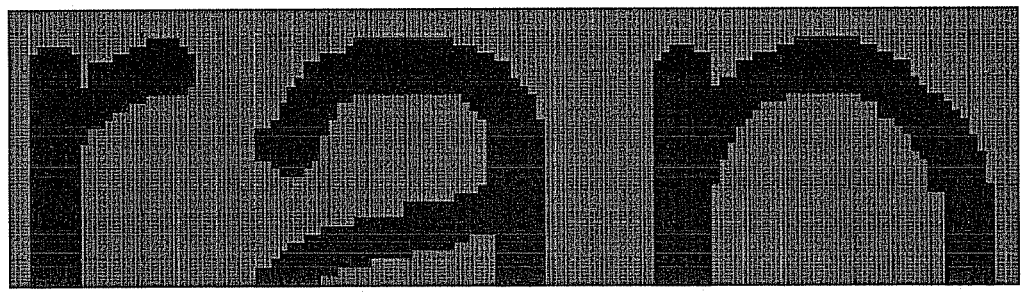
Figure 2A:
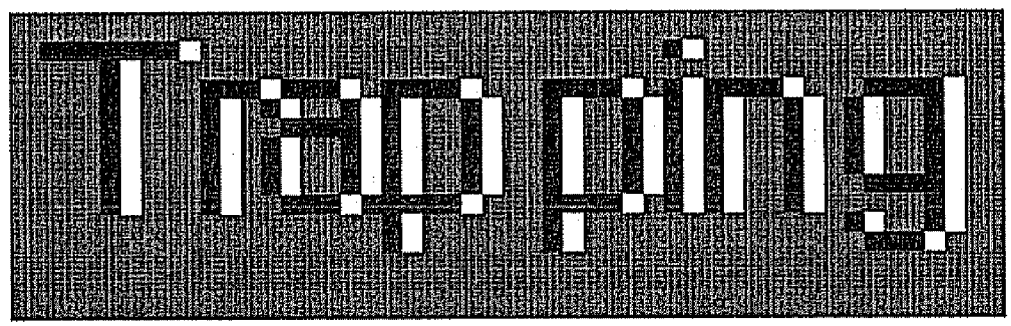
FIGS. 2A and 2B are exemplary views illustrating outputted results of font image before and after an edge emphasis processing of smaller font than that of FIGS. 1A and 1B.
Figure 2B:
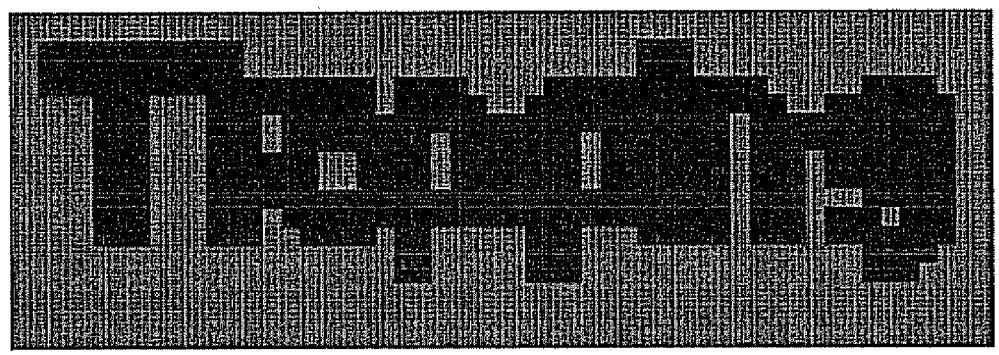

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As shown in FIG. 3, an image processing apparatus 100 comprises a font identifying unit 110, an image processing unit 120, a controller 130, and a user interface (UI) generating unit 140. The image processing apparatus 100 receives image data from an application program 200 such as a word processor for the Korean script or other languages to perform a predetermined image processing and transfers the image processed image data to a printing unit 500, upon receipt of a user request via a user inputting unit 400. The image forming apparatus may include additional and/or different units. Similarly, the functionality of two or more of the above-mentioned units may be integrated into a single component. The image forming apparatus may be, for example, a printer (including ink jet and laser printers), a facsimile machine, or a multi-function device.

The font identifying unit 110 identifies the kind and the size of font included in the image data inputted from the application program 200. As shown in FIGS. 4A and 4B, although the font is set as the same font size value in the application program 200, the real size of the font that is outputted is different depending on the kind of font. As shown in FIG. 4A, if a font "AngsanaUPC" is selected and the size is set as "12", and as shown in FIG. 4B, if a font "Arial" is selected and the size is set as "12", the real sizes of the fonts are different from each other, as shown by the example text. Accordingly, it is desirable to consider not only the font size of the font included in the image data but also the font kind in determining whether the trapping image of the font will be processed.

The image processing unit 120 performs a halftoning image processing and a trapping image processing that slightly overlaps an edge of an image of an adjacent object. The edge of the object can be emphasized by the trapping image processing. The description of the halftoning and the trapping image processing will be omitted as it is a known technology.

The controller 130 controls the image processing unit 120 to perform the trapping image processing only when the size according to the font kind of the font included in the image data identified in the font identifying unit 110 is over a minimum size of the corresponding font kind. The minimum size of the font may be determined by setting the different font size according to the font kind for the trapping image processing so that the font is capable of being discriminated with the naked eye (i.e., readable with the naked eye).

Figure 5A:
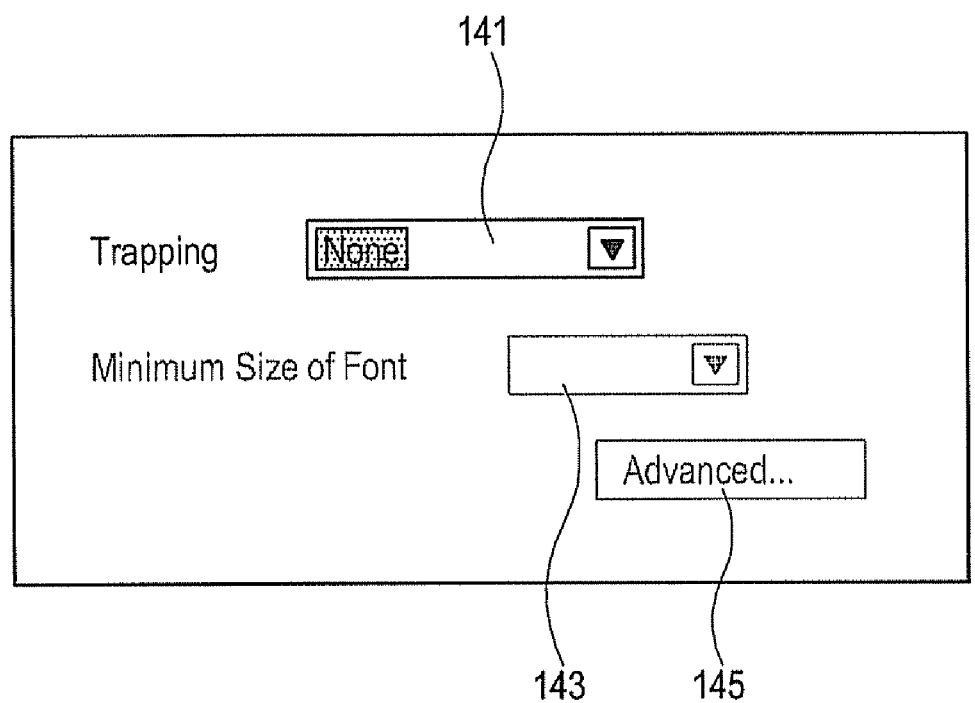
Figure 5B:
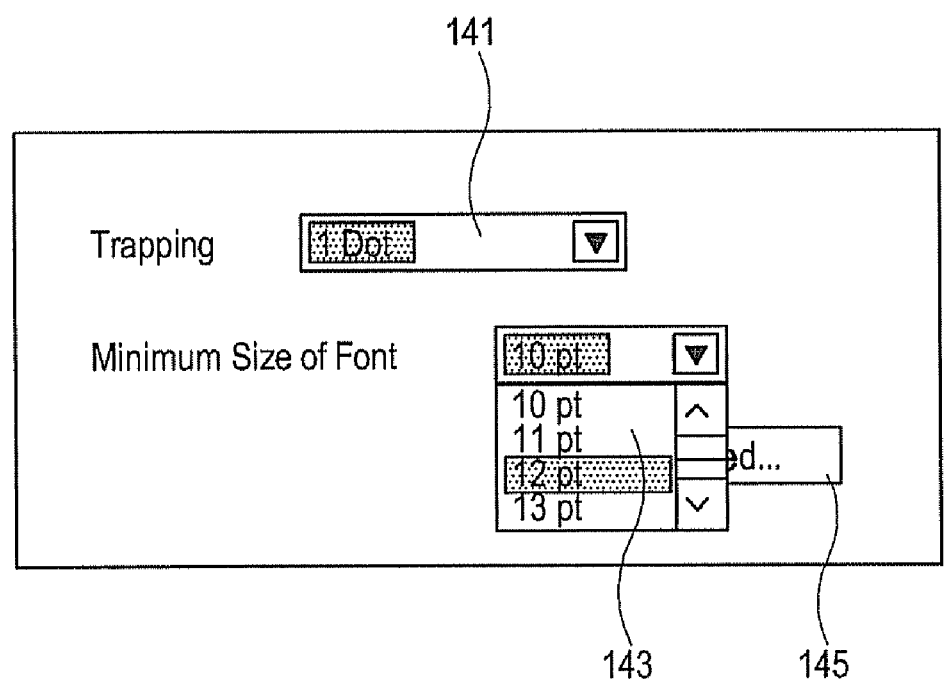

As shown in FIGS. 5A and 5B, the image processing apparatus 100 may further comprise a user interface (UI) generating unit 140 that enables a user to select whether the trapping image processing will be performed. The user interface generating unit 140 can provide a user interface (UI) requesting the user whether the trapping processing will be performed, as shown in FIG. 5A.

As shown in FIG. 5A, the user interface generating unit 140 can generate a trapping combo box 141 to control the intensity of the trapping processing and a combo box 143 of a minimum size of font to receive a minimum font size to perform the trapping processing. As shown in FIGS. 5A-5D, the UI generating unit 140 may generate an "Advanced . . . " icon 145 in a lower end part of the minimum size of font, combo box 143 so that the user can set the minimum size of font to perform the trapping image according to the kind of font.

The controller 130 displays the UI generated in the UI generating unit 140 on a display unit 300, such as a monitor. If the user selects the "Advanced . . . " icon 145 through an inputting unit 400, the controller 130 can display a dialogue window allowing the user to set the minimum size of font to perform the trapping processing according to the kind of font to appear in a display unit 300, as shown in FIG. 5C. As shown in FIG. 5C, the controller 130 can display initialized values that are the experimentally pre-selected minimum font sizes according to the kind of fonts when the font is initially designed. The user can reset the initialized values. If the user inputs a smaller value than the initialized value, the controller 130 may maintain the initialized value unchanged without resetting the original initialized value by an inputted value.

If the user clicks the minimum font size combo box 143 from the inputting unit 400 and inputs the minimum font size to perform the trapping processing, the controller 130 may ignore the font size inputted by the user if the minimum font size inputted by the user is smaller than the minimum size of the font experimentally pre-selected when designed and may regard the minimum size of font selected when designed as a reference value for determining whether the trapping processing will be performed. Accordingly, an undiscriminating font can be prevented from being printed as a result of the user's mis-trapping processing. Alternatively, the UI may prevent the user from selecting a font size below that of the experimentally pre-selected font size.

For example, if the initial designed minimum font size for the 'Arial' font to perform trapping image processing is set as '12' and the user inputs a font '10' in the minimum font size combo box 143, the controller 130 can control the image processing unit 120 to perform the trapping image processing only in the case that the size of the 'Arial' font in the image data is over '12'. If the user inputs '14' in the minimum font size combo box 143, the controller 130 can control the image processing unit 120 to perform the trapping image processing only in the case that the size of font of 'Arial' font in the image data is over '14'.

The image processing apparatus 100 may further comprise a printing unit 500 that prints the image data image-processed by the image processing unit 120. The printing unit 500 may be provided as an electrophotographic type comprising a photosensitive drum, or an ink jet type comprising a head with a nozzle to deposit ink onto the printable medium. The image processing apparatus 100 comprising the printing unit 500 may be provided as a laser printer, an ink jet printer, a scanner, a facsimile machine, and/or a multifunctional device. Accordingly, an undiscriminating font can be prevented from being printed by the trapping image processing regardless of the size of font when the font is printed.

Figure 6:
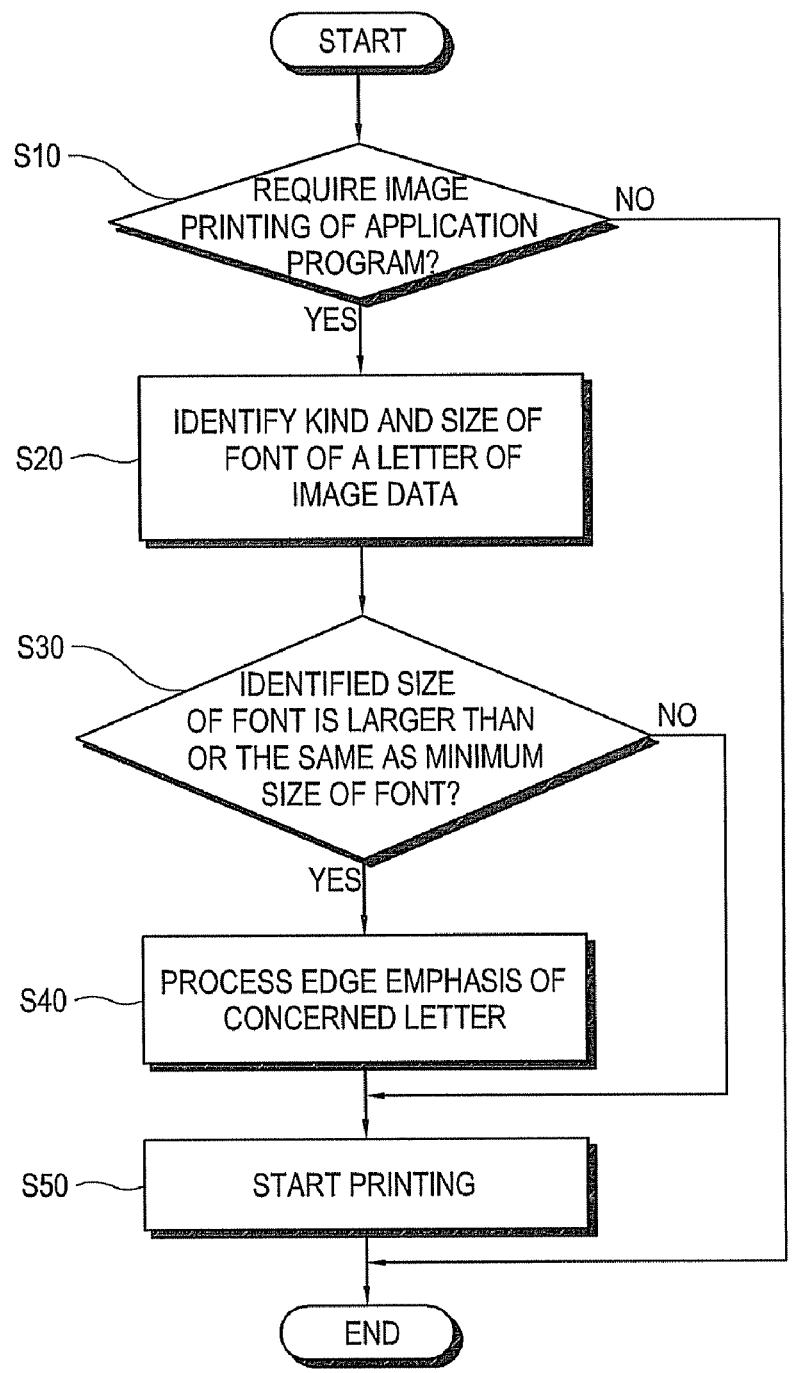
FIG. 6 is a flow chart of the image processing method according to an example embodiment of the present invention.

An image processing method according to an example embodiment of the present invention is shown in FIG. 6. First, whether the image data is required to be printed in an application program is determined at block S10. If the printing is required, the kind and the size of font included in the received image data is identified at block S20.

Next, whether the identified kind and the size of font is larger than the minimum font size required to perform the trapping processing of the concerned font selected is determined at block S30. If the identified font size of the font is larger than the minimum font size, a trapping image processing (edge emphasis processing) of the concerned font is performed at block S40. The image-processed image data is then printed onto a printable medium at block S50.

If the identified font size of font is less than the minimum font size, the trapping image processing is omitted and the image is printed at block S50. Accordingly, an undiscriminating font can be prevented from being printed by the trapping image processing regardless of the size of font when the font is printed. The above-described image processing method may be provided in a printer driver type installed in a host computer (not shown) connected to a laser printer to drive the laser printer.

As described above, the image processing apparatus and the image processing method according to aspects of the present invention has several effects. First, a small font can be recognized with the naked eye when the font is printed. Second, since the size is relatively different according to the kind of font, the trapping reference according to the kind of fonts is differentiated, and accordingly, the font can be recognized by the naked eye irrespective of the kind of font. Third, the user can set whether the edge emphasis processing, that is, the trapping image processing of the font, will be performed, thereby minutely controlling the font image to be printed.

The present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, DVDs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image processing apparatus, comprising:
    an image processing unit to process printing data into image data capable of being outputted;
    a font identifying unit to identify a kind of font and a size of the font included in the printing data;
    a controller to control the image processing unit to perform an edge emphasis processing of a font if the size of the font indentified by the font identifying unit is greater than or equal to a minimum font size corresponding to the kind of font identified by the font identifying unit, wherein the minimum font size varies with the kind of font.

2. The image processing apparatus according to claim 1, further comprising:
    a display unit; and
    a user interface (UI) generating unit to generate a UI to be displayed by the display unit for a user to input the minimum font size.

3. The image processing apparatus according to claim 2, wherein the UI generating unit generates the UI to set the minimum font size according to the kind of font.

4. The image processing apparatus according to claim 1, wherein the controller controls the image processing unit to perform the edge emphasis processing if the size of the font is greater than an experimentally pre-selected minimum font size.

5. The image processing apparatus according to claim 2, wherein the controller ignores the minimum font size inputted by the user if the inputted minimum font size is less than an experimentally pre-selected minimum font size.

6. The image processing apparatus of claim 1, wherein the minimum font size is input by a user.

7. The image processing apparatus of claim 1, wherein the minimum font size is based on a pre-selected minimum font size.

8. An image processing method, comprising:
    processing printing data into image data capable of being outputted;
    identifying a size of a font and a kind of the font included in the printing data; and
    processing an edge emphasis of a font if the identified size of the font is greater than or equal to a minimum font size corresponding to the identified kind of the font, wherein the minimum font size varies with the kind of font.

9. The image processing method according to claim 8, wherein the minimum size of font is set according to the kind of font when processing the edge emphasis of the font.

10. The image processing method according to claim 9, further comprising:
    generating a user interface (UI) for a user to input the minimum font size; and
    displaying the UI to the user.

11. The image processing method according to claim 10, wherein the UI is provided to set the minimum font size according to the kind of font.

12. The image processing method according to claim 8, further comprising:
    generating user interface (UI) for a user to input the minimum font size; and
    displaying the UI to the user.

13. The image processing method according to claim 12, wherein the UI is provided to set the minimum font size according to the kind of font.

14. A non-transitory computer readable medium comprising instructions that, when executed by an image processing apparatus, cause the image processing apparatus to perform the method according to claim 8.

* * * * *

UNITED STATES PATENT AND TRADEMARK OFFICE
CERTIFICATE OF CORRECTION

PATENT NO. : 8,269,986 B2
APPLICATION NO. : 11/865781
DATED : September 18, 2012
INVENTOR(S) : Sa-bong Jeong It is certified that error appears in the above-identified patent and that said Letters Patent is hereby corrected as shown below:

In the Claims:

Column 5; Line 40 (Approx.); In Claim 1, delete "indentified" and insert -- identified --, therefor.

Signed and Sealed this
Fourteenth Day of May, 2013

Teresa Stanek Rea
*Acting Director of the United States Patent and Trademark Office*